Patented Nov. 16, 1943

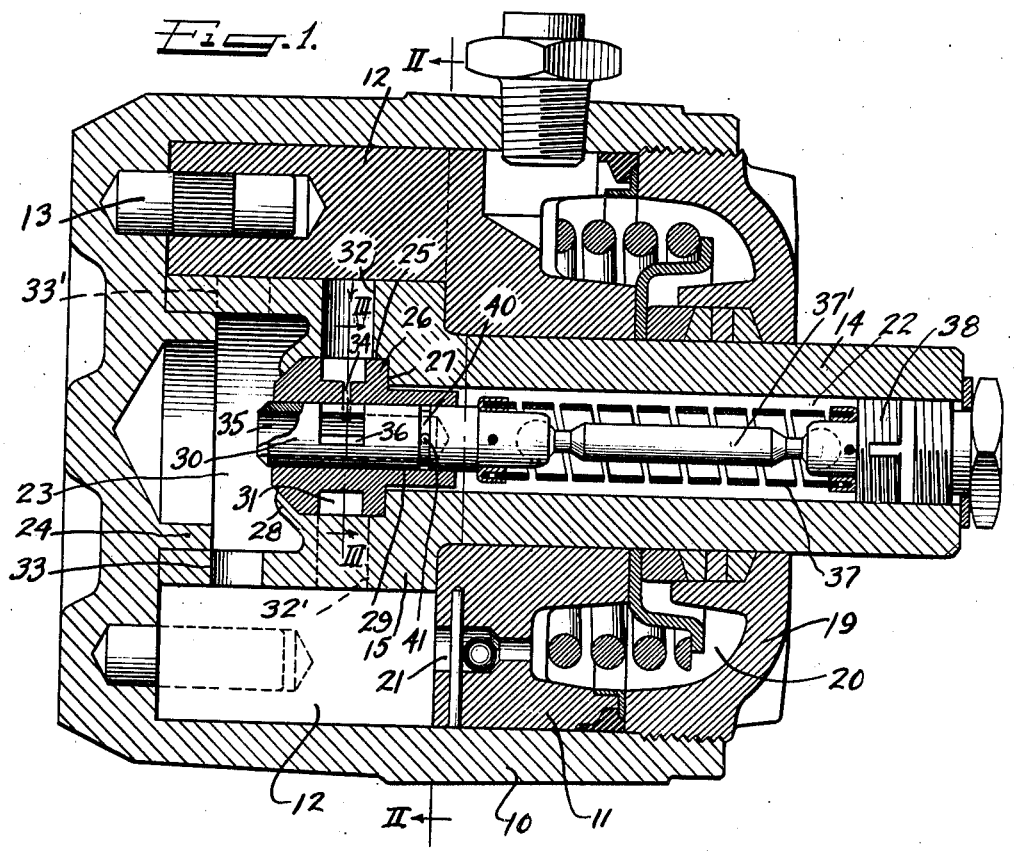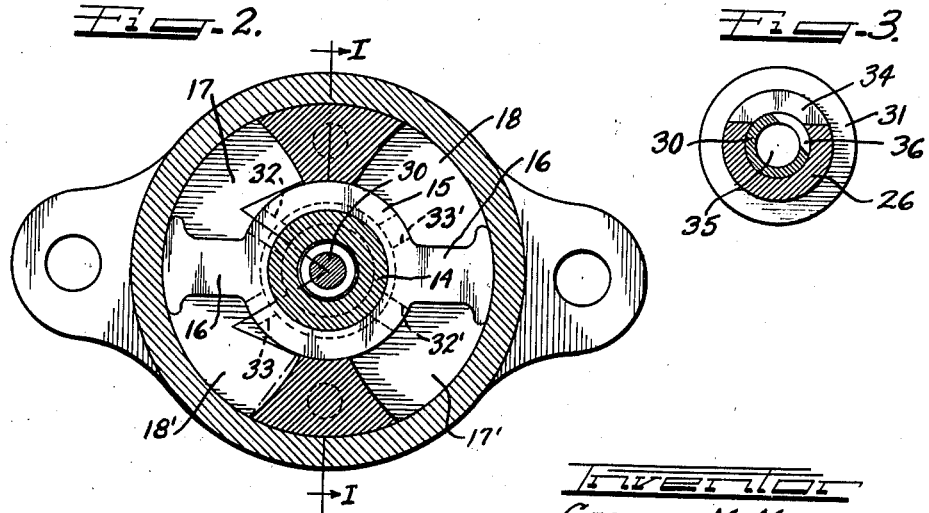

2,334,340

UNITED STATES PATENT OFFICE 2,334,340

HYDRAULIC SHOCK ABSORBER STRUCTURE

Gervase M. Magrum, Buffalo, N. Y., assignor, by mesne assignments, to Houdaille-Hershey Corporation, Detroit, Mich., a corporation of Michigan Application May 26, 1941, Serial No. 395,148

3 Claims. (Cl. 188—100)

This invention relates to hydraulic shock absorbers and particularly to improved means for controlling the flow of the displaced hydraulic fluid. The invention is particularly useful in hydraulic shock absorbers of the rotary type or so called "Houdaille" type in which valve assembly mounted within the piston structure controls the flow between the hydraulic working chambers, as for example the type of shock absorber disclosed in Peo et al. Patent 2,004,902, June 11, 1935, or Peo Patent No. 2,079,869, May 11, 1937.

In this type of shock absorber referred to, a valve seating member is seated in the hollow hub of the piston structure and is bored to receive a cylindrical valve for controlling an orifice in the seat member, the valve being provided with a stem structure extending through a bore in the piston structure shaft, by which stem structure rotary movement may be imparted to the valve for adjustment thereby of the orifice. With this arrangement, the hydraulic fluid displaced under heavy pressure will tend to leak out between the valve and the seat member and into the shaft bore, particularly after the valve becomes more or less worn. In some shock absorbers the shaft bore has been connected thru a vent passageway with the shock absorber reservoir, as for example in Peo et al. Patent 2,004,902, the leakage fluid thus finding its way from the shaft bore into the reservoir. However, with this arrangement, when the leakage becomes more pronounced, particularly when the hydraulic fluid becomes heated and of decreased viscosity, the leakage flow may become greater than the replenishing flow into the working chambers from the reservoir and resulting air pockets in the working chambers would materially interfere with efficient shock absorber action.

In some shock absorbers it is more desirable to omit the passageway from the shaft bore to the reservoir and to keep the shaft bore closed, as shown in Peo Patent 2,079,869. However, with such arrangement, the leakage into the shaft bore will pile up and exert back pressure against the valve seat member tending to loosen it or displace it from its seat which would result in leakage and the loosened seat member would cause noisy operation.

The important object of my invention is to provide simple means for preventing unbalanced pressure against the valve seat member which would tend to loosen such member, and with such means operable to intercept the leakage fluid along the valve and return it to the working chambers.

An efficient arrangement for accomplishing the objects of my invention is disclosed on the drawing in which Figure 1 is a vertical diametral sectional view on plane I—I of Figure 2;

Figure 2 is a section on plane II—II of Figure 1; and

Figure 3 is a section on plane III—III of Figure 1.

Briefly describing the shock absorber, it comprises a cup-shaped housing 10 receiving near its outer end a bearing wall 11 from which abutment walls 12 extend to the base of the housing, pins 13 holding the wall and abutment against rotational displacement in the housing. The bearing wall journals the piston shaft 14 extending from the cylindrical piston hub 15 between the abutments 12, the hub having vanes 16 which, with the abutments, define hydraulic working chambers 17, 17' and 18, 18'.

A closure member or cover 19 screws into the outer end of the housing 10 to axially hold the wall 11 and abutments 12 in place, the wall 11 and cover 19 having opposed recesses forming a reservoir 20 for hydraulic fluid which is fed to the working chambers through check valve controlled passageways 21, in a manner well known in the art. When the shock absorber is employed on a vehicle, the housing is usually secured to the vehicle body and the outer end of the piston shaft is connected by suitable levers with the vehicle axle so that upon relative movement between axle and body the piston structure will be oscillated within the housing to displace fluid in the working chambers.

The piston shaft has the bore 22 extending therethrough and at its inner end the piston hub has a larger bore or chamber 23 into which extends the boss 24 on the housing base for providing a bearing for the piston structure. In the piston hub is the intermediate bore 25 in which is located the valve seating member 26 which is held against the shoulder 27 as by peening against its inner end of the annular tongue of metal 28 of the piston hub.

The seat member 26 has the axial bore 29 forming a seat for the cylindrical valve 30. The seat member has the circumferential channel 31 which registers with the passageways 32, 32' in the piston hub, these passageways communicating with the high pressure hydraulic working chambers 17, 17' respectively of the shock absorber. The chamber 23 in the piston hub communicates through passageways 33, 33' with the low pressure working chambers 18 and 18' respectively.

The seating member 26 has the circumferentially extending orifice slot 34 therethrough. The valve 30 has the passageway or bore 35 extending thereinto from the inner end thereof and the valve has the circumferentially extending port 36 for connecting the valve passageway 35 with the orifice slot. The valve is rotatably adjustable in the seat member for overlapping by its port 36 of the orifice slot 34 for the desired degree of orifice slot exposure and shock absorber resistance to the displaced hydraulic fluid flow during operation of the shock absorber.

The valve 30 is connected by a stem 37 with a head 38 rotatable in the outer end of the shaft bore 22 for setting of the valve for adjustment of its port relative to the orifice slot 34. On the drawings this stem 37 is shown in the form of a helical thermostat secured at its inner end to the outer end of the valve and at its outer end to the head 38 so that the valve will be automatically set by temperature for control of the orifice 34. To hold the valve against axial displacement in the valve seat, a rod 37' is provided which has ball and socket connection at its ends with the valve and head respectively.

In the shock absorber shown, the high pressure flow during rebound movement of the vehicle springs with which the shock absorber is associated, would be from the working chambers 17, 17' through the passageways 32 and 32' and through the orifice 34 into the valve bore and the chamber 23 and from there through the passageways 33, 33' to the working chambers 18, 18'. This high pressure flow, resisted by the restricted orifice, will tend to cause leakage flow between the valve and the seat member and into the shaft bore 22; and if this shaft bore is closed, considerable pressure will be built up against the outer end of the valve seat 26. This will be particularly true for valve operation as disclosed in Peo et al. Patent 2,004,902, where the rebound pressure through the orifice against the valve will effect rotation of the valve to decrease the size of the orifice. After a period of service of the shock absorber, the valve will wear and there would be greater leakage and greater build up of pressure against the seat member and the pressure might become sufficient to bend the securing means 28 for the seat member so that the seat member would become loosened and more leakage into the shaft bore would result. The important object of my invention is to prevent the leakage from reaching the shaft bore, and I accomplish this by providing the intercepting channel 40 in and around the valve 30 at a point inwardly of the outer end of the seating member 26, and a connection between this intercepting channel and the outer end of the valve bore by a port or passageway 41. With this arrangement any leakage flow outwardly between the valve and the seat member will be intercepted by the channel and prevented from reaching the shaft bore and will be conducted by the passage 41 to the valve bore from where it would flow into the chamber 23 and to the shock absorber low pressure working chambers 18 and 18'; the suction effect in these working chambers during rebound operation of the shock absorber assisting in withdrawing the leakage fluid from the intercepting channel for return to the working circuit. The leakage being thus prevented from reaching the shaft bore there can be no accumulation of fluid or build up of pressure in the shaft bore against the valve seat member.

During down stroke of the shock absorber when the fluid is displaced from the working chambers 18, 18' to the chambers 17, 17', the fluid pressure is directed against the inner end of the valve seat member in a direction to hold it to its seat. During the bound operation of the shock absorber, the orifice will be at normal opening and will offer less resistance to flow than during the rebound stroke, and there will be little tendency for fluid to leak past the valve toward the shaft bore 22; any fluid flow between the valve and seat member being intercepted by the channel 40 and drawn back into the working circuit by the suction effect in the working chambers 17 and 17' before it can reach the shaft bore. The intercepting arrangement thus prevents flow into the shaft bore during both bound and rebound operation of the shock absorber.

In shock absorbers where the shaft bore is vented to the reservoir, as in Peo et al. Patent 2,004,902, leakage past the valve will be unable to build up any pressure against the valve seat. However, the leakage, after a period of use of the shock absorber, may become so great that this drainage from the working circuit may be at a greater rate than the rate of replenishment of the working circuit through the replenishing passages between the reservoir and the working circuit and the operation of the shock absorber would be seriously impaired. All this can be readily avoided by providing an intercepting channel and path for return of the leakage fluid directly back into the working circuit. Thus, whether the shaft bore is closed, or is vented to the reservoir, my improved arrangement will prevent accumulation of leakage in the shaft bore but will intercept leakage and return it directly into the hydraulic working circuit and thereby prevent any unbalanced pressure condition against the valve seating member tending to displace or loosen it, full efficiency of the shock absorber being thus maintained.

I have shown a practical and efficient embodiment of my invention but I do not desire to be limited to the exact construction, arrangement and operation shown and described as changes may be made without departing from the scope of the invention.

I claim as follows:

1. Valving assembly for controlling the flow of the displaced fluid in the hydraulic working chambers of a hydraulic shock absorber of the type described in which a vaned piston operating in the chambers and drive shaft extending therefrom have a bore therethrough, comprising a valve seat member seated in said bore intermediate the ends thereof and having an orifice for metering the flow of hydraulic fluid displaced in the working chambers during operation of the shock absorber, a cylindrical valve extending through said seat member and having a port, said valve being adjustable rotatably in said seat member for cooperation of its port with said orifice to determine the effective size of said orifice, said valve having a passageway therein for connecting said port with the inner end of said bore, said valve outwardly of its port and inwardly of the outer end of said seat member having a circumferentially extending channel therein for intercepting any fluid tending to flow from the working chambers out between the valve and seat member toward the outer end of the bore to thus prevent its reaching the bore, said channel being connected with the valve passageway for conducting the intercepted fluid to the inner end of said bore and directly back into the hydraulic working chambers.

2. Valving assembly for controlling the displaced fluid flow in the hydraulic working chambers of a hydraulic shock absorber in which a vaned piston structure operates and has a bore therethrough, comprising a seating member seated in said bore to form a wall between the inner and outer ends thereof, a hollow valve plug extending through said seat member, said seat member and said valve plug having passageways cooperable to define a metering orifice for the hydraulic fluid flow caused by said piston structure, said valve plug outwardly of said metering orifice and inwardly of the outer end of said seat member having a circumferentially extending channel connected with the interior of said valve plug for intercepting and returning directly into the hydraulic working chambers any fluid which may tend to leak therefrom between said valve plug and seat and to thereby prevent such fluid from reaching the outer end of said bore.

3. Valving assembly for controlling the displaced fluid flow in the hydraulic working chambers of a hydraulic shock absorber of the type described in which a vaned piston structure operating in the chambers has a bore extending therethrough, comprising a valve seat member seated in said bore and having an orifice for metering the flow of displaced hydraulic fluid during operation of the shock absorber, a valve adjustable in said seat member and having a port cooperable with said orifice to determine the effective metering size thereof, said valve having a passageway connecting its port with the inner end of said bore, and means between said valve and seat member for intercepting the flow of leakage fluid from the working chambers toward the outer end of said bore and returning the fluid directly to the working chambers to thereby prevent unnecessary loss of fluid from the working chambers during operation of the shock absorber.

GERVASE M. MAGRUM.